United States Patent
Ho (10) Patent No.: US 10,967,781 B2
(45) Date of Patent: Apr. 6, 2021

(54) ILLUMINATED VEHICULAR EMBLEM (71) Applicant: CHICONY POWER TECHNOLOGY CO., LTD., New Taipei (TW)

(72) Inventor: Hsuan-Wei Ho, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/712,335

(22) Filed: Dec. 12, 2019

(65) Prior Publication Data
US 2021/0009030 A1 Jan. 14, 2021

(30) Foreign Application Priority Data

Jul. 9, 2019 (TW) .................................. 10812414

(51) Int. Cl.
| | |
|---|---|
| *F21V 8/00* | (2006.01) |
| *B60Q 1/26* | (2006.01) |
| *B60Q 1/00* | (2006.01) |
| *B60R 13/00* | (2006.01) |

(52) U.S. Cl.
CPC ......... *B60Q 1/2696* (2013.01); *B60Q 1/0017* (2013.01); *B60R 13/005* (2013.01); *G02B 6/005* (2013.01); *G02B 6/0051* (2013.01); *G02B 6/0055* (2013.01); *G02B 6/0068* (2013.01)

(58) Field of Classification Search
CPC .......................................... G02B 6/0035–0043
See application file for complete search history.

(56) References Cited

U.S. PATENT DOCUMENTS

| | | | |
|---|---|---|---|
| 2005/0213351 A1* | 9/2005 | Yang ...................... | B60Q 1/323 |
| | | | 362/633 |
| 2011/0194305 A1* | 8/2011 | Chen ....................... | G09F 13/18 |
| | | | 362/606 |
| 2017/0357044 A1 | 12/2017 | Kuramitsu | |

FOREIGN PATENT DOCUMENTS

| | | |
|---|---|---|
| CN | 202175002 U | 3/2012 |
| CN | 103158633 A | 6/2013 |
| CN | 204937005 U | 1/2016 |
| CN | 204956342 U | 1/2016 |
| CN | 205121002 U | 3/2016 |
| CN | 107344531 A | 11/2017 |
| TW | M404454 U1 | 5/2011 |
| TW | I358686 B1 | 2/2012 |
| TW | I424210 B | 1/2014 |

* cited by examiner

*Primary Examiner* — Sean P Gramling
(74) *Attorney, Agent, or Firm* — Muncy, Geissler, Olds & Lowe, P.C.

(57) ABSTRACT

An illuminated vehicular emblem for a means of transportation includes a housing unit, a lighting unit and a light dimming unit. The housing unit includes a bottom case, a top case disposed on the bottom case, and an emblem member disposed above the top case. A receiving space is defined between the top and bottom cases to receive the lighting unit. The lighting unit includes a light guide plate, light emitting components and a first light shielding film disposed on the light guide plate. The light emitting components are disposed at the light guide plate such that the light guide plate receives light emitted from the light emitting components. The light dimming unit changes the direction of propagation of the light and includes a first dot portion distributed on the light guide plate and along a projection of an outline of the emblem member.

15 Claims, 6 Drawing Sheets

ILLUMINATED VEHICULAR EMBLEM

BACKGROUND OF THE INVENTION

Field of the Invention

The present disclosure relates to illuminated vehicular emblems and, more particularly, to an illuminated vehicular emblem using a lighting module with a planar light guiding structure to improve its illuminant effect.

Description of the Prior Art

The special illuminant effects of recent vehicular emblems are usually implemented by additional illumination. Conventional illumination of vehicular emblem involves numerous light emitting diodes (LEDs) which lie under an emblem plate usually installed on the front and the tail of a vehicle, wherein the LEDs are arranged in a way to align with the outline of the emblem plate. Light emitted from the LEDs passes through the gaps between the emblem plate and the housing of emblem to directly illuminate the outline of the emblem plate. However, according to the prior art, the distance between the LEDs and the expected light exit regions (e.g., the gaps) must be at least 5 mm to achieve light scattering (because the effect of halation appears slightly farther from the light source). As a result, the total thickness of the vehicular emblem is increased, and some problems about light leakage are likely to occur. In general, according to the prior art, the illumination of the outline of the vehicular emblem is seldom soft and often causes dazzling light spots. Furthermore, the numerous LEDs of the conventional vehicular emblem must be mounted dispersedly on a circuit board, thus the circuit board must be sufficiently large. In this regard, when the necessary number of the LEDs is plenty, the illuminated emblem would incur an additional cost.

Therefore, it is imperative to provide an illuminated vehicular emblem that overcomes the drawbacks of the prior art.

SUMMARY OF THE INVENTION

It is an objective of the present disclosure to provide an illuminated vehicular emblem using a lighting module with a planar light guiding structure to improve its illuminant effect.

In order to achieve the above and other objectives, the present disclosure provides an illuminated vehicular emblem suitable for a means of transportation. The illuminated vehicular emblem comprises a housing unit, a lighting unit and a light dimming unit. The housing unit is adapted to be disposed on the means of transportation. The housing unit comprises a bottom case, a top case and an emblem member. The top case is disposed on the bottom case. The emblem member is disposed above the top case to achieve visual recognition. A receiving space is defined between the top case and the bottom case to receive the lighting unit. The lighting unit comprises a light guide plate, a plurality of light emitting components and a first light shielding film. The plurality of light emitting components are threaded through the light guide plate and disposed at a central area of the light guide plate to allow the light guide plate to receive light emitted from the plurality of light emitting components. The first light shielding film is disposed on the light guide plate. The light dimming unit is disposed on the light guide plate to change the direction of propagation of the light. The light dimming unit comprises a first dot portion. The first dot portion is distributed on the light guide plate and along a projection of an outline of the emblem member.

DETAILED DESCRIPTION OF THE EMBODIMENTS

Objectives, features, and advantages of the present disclosure are hereunder illustrated with preferred embodiments, depicted with drawings, and described below.

Figure 1:
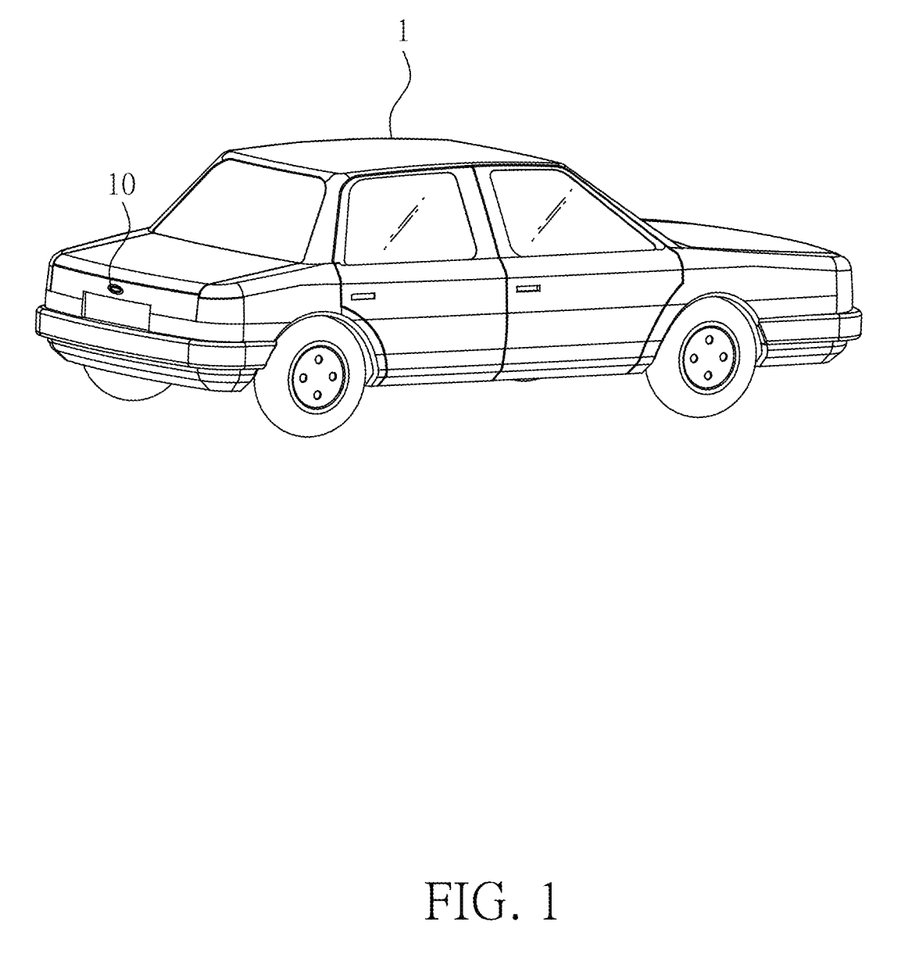
FIG. 1 is a schematic perspective view of an illuminated vehicular emblem disposed on a means of transportation according to the present disclosure.

Refer to FIG. 1, which illustrates a schematic perspective view of an illuminated vehicular emblem disposed on a means of transportation according to the present disclosure.

In the first embodiment of the present disclosure, an illuminated vehicular emblem 10 is suitable for a means of transportation 1. The means of transportation 1 can be a car, a motorcycle, an agricultural truck or an engineering truck, but the present disclosure is not limited thereto. The illuminated vehicular emblem 10 is disposed at the front and/or the tail of the means of transportation 1. For instance, as shown in FIG. 1, the illuminated vehicular emblem 10 is disposed at the tail of the means of transportation 1, but the present disclosure is not limited thereto.

Figure 2A:
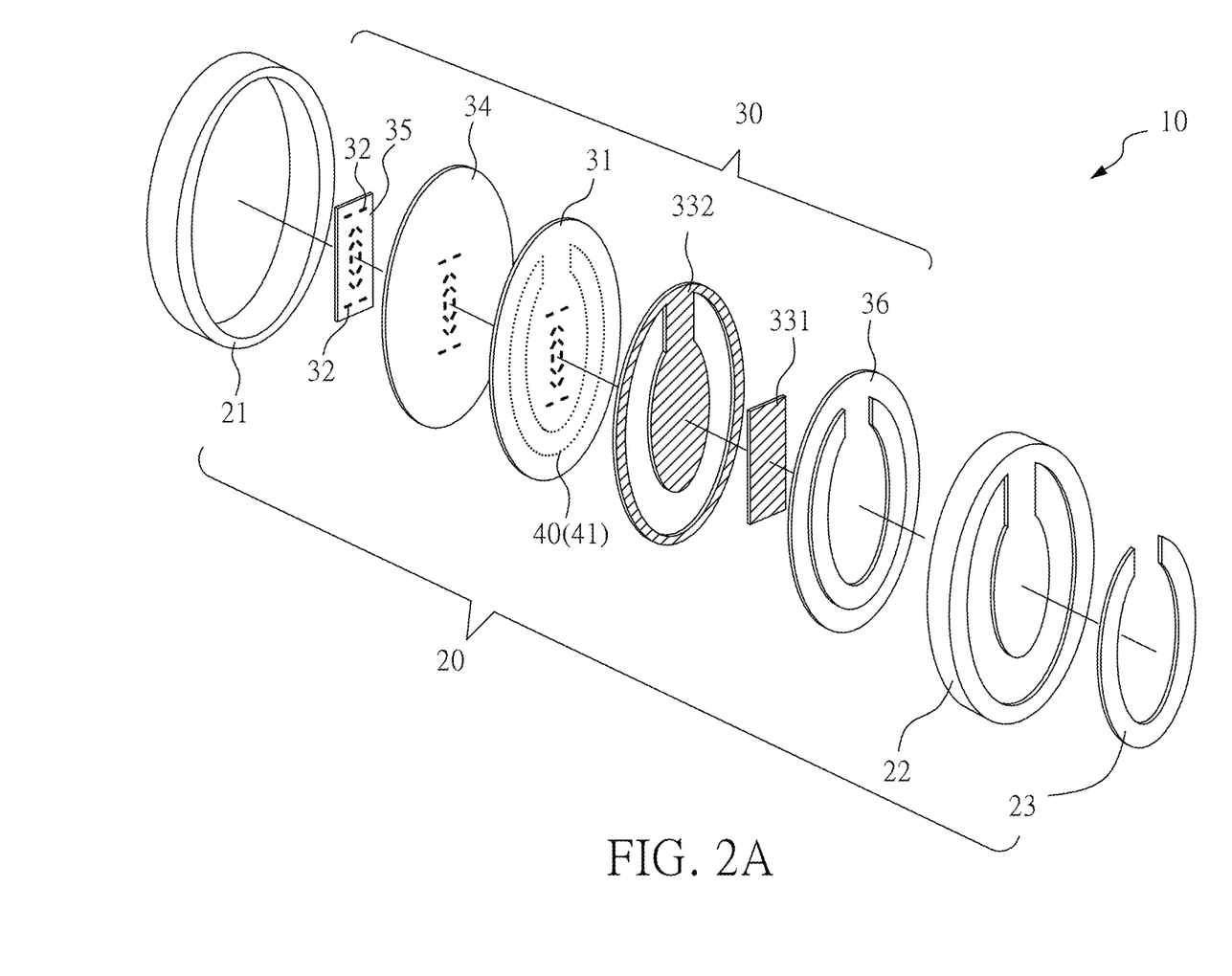
FIG. 2A is a schematic exploded view of the illuminated vehicular emblem according to a first embodiment of the present disclosure.
Figure 2B:
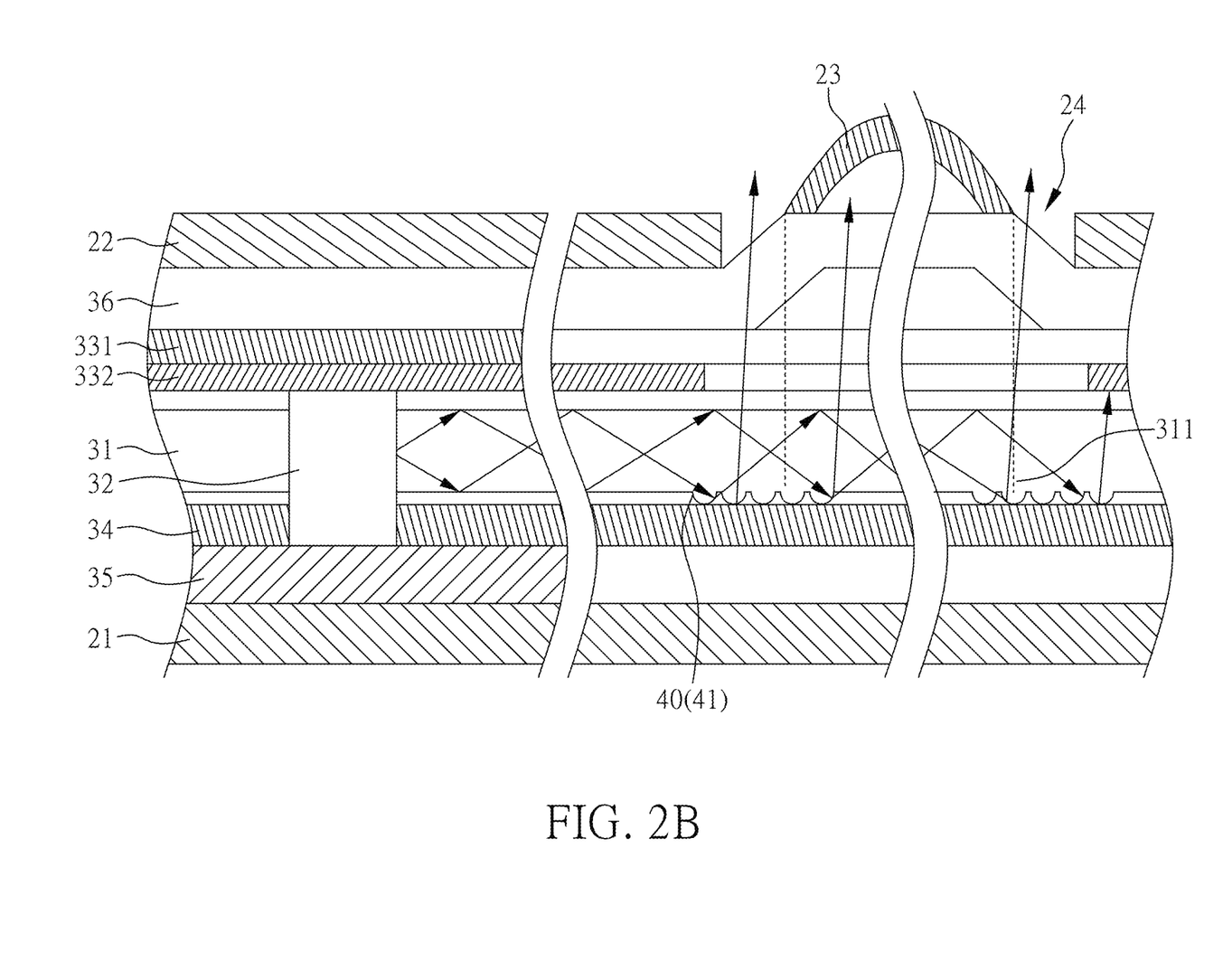
FIG. 2B is a schematic cross-sectional view of the illuminated vehicular emblem according to the first embodiment of the present disclosure.

Refer to FIG. 2A and FIG. 2B. FIG. 2A illustrates a schematic exploded view of the illuminated vehicular emblem according to a first embodiment of the present disclosure, and FIG. 2B illustrates a schematic cross-sectional view of the illuminated vehicular emblem according to the first embodiment of the present disclosure.

The illuminated vehicular emblem 10 comprises a housing unit 20, a lighting unit 30 and a light dimming unit 40. The housing unit 20 is directly disposed on the means of transportation 1 (see FIG. 1), The housing unit 20 comprises a bottom case 21, a top case 22 and an emblem member 23. One or all of the bottom case 21, the top case 22 and the emblem member 23 is/are made of plastic, metal or any appropriate material, but the present disclosure is not limited thereto. The top case 22 is disposed on the bottom case 21.

The emblem member 23 is disposed above the top case 22 to achieve visual recognition, but the present disclosure is not limited to the appearance of the emblem member 23 as presented in FIG. 2A. A receiving space is defined between the top case 22 and the bottom case 21 to receive the lighting unit 30. The placement of the lighting unit 30 can correspond to the pattern of the emblem member 23 so as to provide a better illuminant effect.

The lighting unit 30 is a lighting module with a planar light guiding structure and comprises a light guide plate 31, a plurality of light emitting components 32, a first light shielding film 331, a second light shielding film 332, a reflection plate 34, a circuit board 35 and a diffusion plate 36. The light guide plate 31 is made of a transparent substance, such as glass, transparent plastic or transparent acrylic plastic. The plurality of light emitting components 32 is threaded through the light guide plate 31 and disposed at a central area of the light guide plate 31 to allow the light guide plate 31 to receive the light emitted from the plurality of light emitting components 32. In this embodiment, the plurality of light emitting components 32 are LEDs and are arranged in the manner shown in FIG. 2A to minimize the number of LEDs, but the present disclosure is not limited thereto. The plurality of light emitting components 32 emits the light horizontally from the central area of the light guide plate 31 toward the outside of the light guide plate 31. Hence, the light from the plurality of light emitting components 32 directly enters the light guide plate 31 to perform total internal reflection within the light guide plate 31, as shown in FIG. 2B.

The first light shielding film 331 is made of an opaque material and disposed on the second light shielding film 332 by being adhered to or coated on the second light shielding film 332. An area of the first light shielding film 331 is smaller than that of the second light shielding film 332. The first light shielding film 331 covers the plurality of light emitting components 32 from above to prevent the light of the plurality of light emitting components 32 from emitting directly resulting in glare or dazzling light beams. The second light shielding film 332 is disposed between the first light shielding film 331 and the light guide plate 31 to block the direct light of the plurality of light emitting components 32 and to allow the guided light of the plurality of light emitting components 32 exiting from the light guide plate 31 via a light transmitting portion of the second light shielding film 332 (e.g., a transparent portion or a hollowed-out hole corresponding to the pattern to the emblem member 23). A surface of the second light shielding film 332 that contacts the light guide plate 31 is coated with a reflective coating so as to form a reflection layer. In another variant embodiment of the present disclosure, the second light shielding film 332 can be omitted.

The reflection plate 34 is disposed between the bottom case 21 and the light guide plate 31. The plurality of light emitting components 32 is threaded through the reflection plate 34 and disposed at the reflection plate 34, as shown in FIG. 2B. The reflection plate 34 reflects the light emitted from the plurality of light emitting components 32 (usually resulting from the refraction of the light dimming unit 40) such that the light does not leak out to the bottom case 21. The circuit board 35 is disposed between the bottom case 21 and the reflection plate 34. The plurality of light emitting components 32 is electrically connected to the circuit board 35. The circuit board 35 transmits electrical power or control signals to the plurality of light emitting components 32, The electrical power or the control signals provided to the plurality of light emitting components 32 can be directly supplied by the means of transportation 1 or supplied by a circuit module of the circuit board 35, but the present disclosure is not limited thereto.

The diffusion plate 36 is disposed between the top case 22 and the first light shielding film 331, The diffusion plate 36 can be a haze film for uniforming the distribution of the light. In this embodiment, the diffusion plate 36 has a bulge portion corresponding to the pattern of the emblem member 23 and adapted to support the emblem member 23, as shown in FIG. 2B. In this embodiment, the stacked layers of the lighting unit 30 are listed below in sequence from the bottom (a side near to the means of transportation 1) to the top (a side far from the means of transportation 1): the circuit board 35, the reflection plate 34, the light guide plate 31, the second light shielding film 332, the first light shielding film 331 and the diffusion plate 36, but the present disclosure is not limited to the aforesaid sequence.

Figure 5:
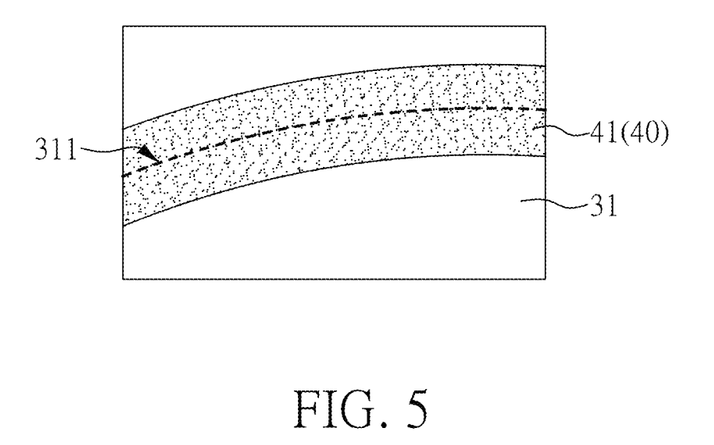
FIG. 5 is a partial enlarged schematic top view of the light dimming unit disposed on the light guide plate according to the first embodiment of the present disclosure.

Now refer to FIG. 2A, FIG. 2B and FIG. 5. FIG. 5 is a partial enlarged schematic top view of the light dimming unit disposed on the light guide plate according to the first embodiment of the present disclosure.

The light dimming unit 40 is disposed on the light guide plate 31 to densely deploy a plurality of optical dots at some locations of the light guide plate 31, in order to cancel the total internal reflection of the light at some places within the light guide plate 31 and to change the direction of propagation of the light. The light dimming unit 40 comprises a first dot portion 41. The first dot portion 41 is constituted by a collection of optical dots. In this embodiment, each optical dot is a tiny convex bump which protrudes from a surface of the light guide plate 31, but the present disclosure is not limited thereto. In another variant embodiment of the present disclosure, each optical dot can be a tiny concave pit hollowed from the surface of the light guide plate 31 or a printed ink dot coated on the surface of the light guide plate 31.

The optical dots of the first dot portion 41 are distributed on the light guide plate 31 and along the projection of the outline of the emblem member 23; in other words, the optical dots of the first dot portion 41 are disposed around a projection position 311 of the light guide plate 31 and along the outline of the emblem member 23, as shown in FIG. 2B and FIG. 5. In this embodiment, the first dot portion 41 is disposed on the bottom surface of the light guide plate 31, but the present disclosure is not limited thereto. In yet another variant embodiment of the present disclosure, the first dot portion 41 is disposed on the top surface of the light guide plate 31. In this embodiment, the optical dots of the first dot portion 41 are uniformly distributed within a region which is specifically defined on the light guide plate 31 for corresponding to the emblem member 23, but the present disclosure is not limited thereto. In another variant embodiment of the present disclosure, in order to meet different requirements of illumination, the optical dots of the first dot portion 41 may not be uniformly distributed within the region which is specifically defined on the light guide plate 31 for corresponding to the emblem member 23.

As shown in FIG. 2B, when the light emitted from the light emitting components 32 reaches the light dimming unit 40 while propagating inside the light guide plate 31, the light would be refracted downward and outward by the light dimming unit 40 due to the cancellation of the total internal reflection caused by the optical dots, and then reflected upward by the reflection plate 34 to propagate toward the emblem member 23. Therefore, part of the light, which reaches the light dimming unit 40, would pass through the light transmitting portion of the second light shielding film 332 and the bulge portion of the diffusion plate 36 in sequence. Finally, such part of the light exits from the illuminated vehicular emblem 10 via a gap 24 between the top case 22 and the emblem member 23, as shown in FIG. 2B, resulting in a much improved illuminant effect of the illuminated vehicular emblem 10 without the glare and the dazzling light spots.

Figure 3:
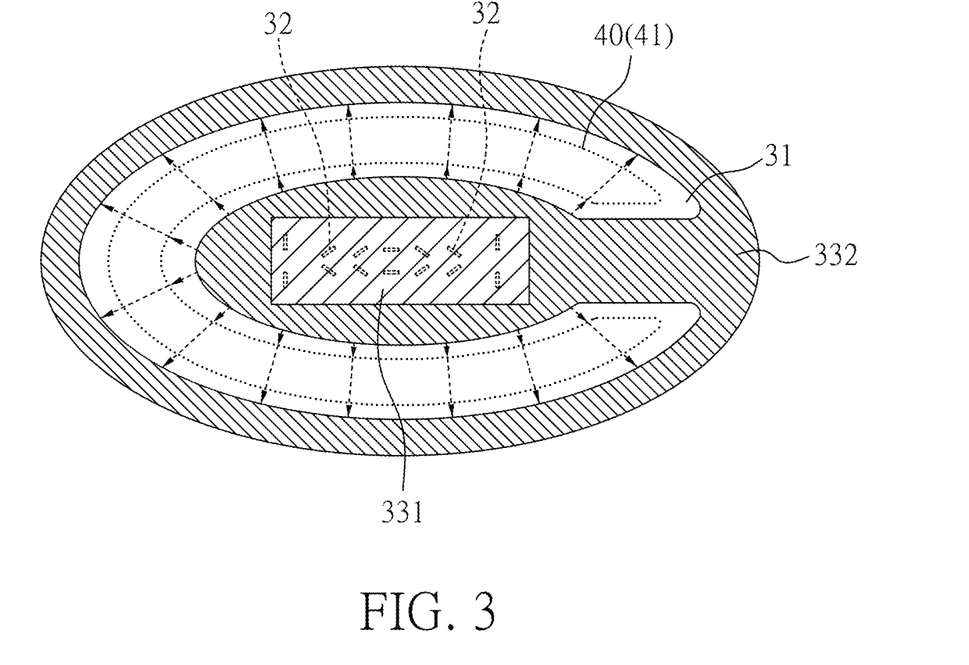
FIG. 3 is a schematic top view of light emitting components while lighting, a light guide plate, a first light shielding film, a second light shielding film and a light dimming unit of the illuminated vehicular emblem according to the first embodiment of the present disclosure.
Figure 4:
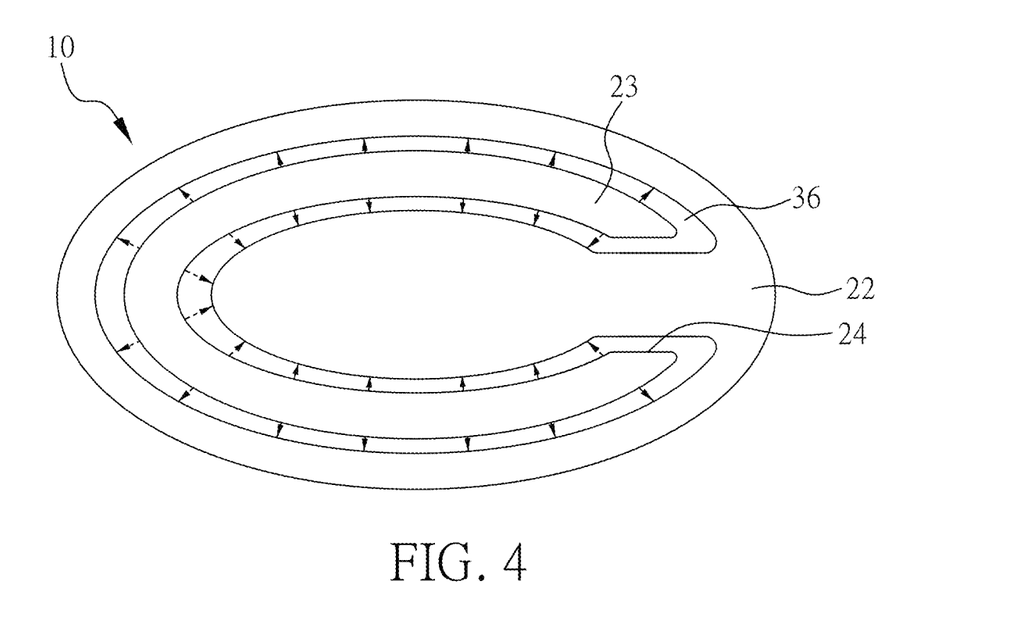
FIG. 4 is a schematic top view of the illuminated vehicular emblem while illuminating according to the first embodiment of the present disclosure.

Hence, while the plurality of light emitting components 32 emits light, the state of illumination would be as shown in FIG. 3 and FIG. 4. Please refer to FIG. 3 and FIG. 4. FIG. 3 illustrates a schematic top view of light emitting components while lighting, a light guide plate, a first light shielding film, a second light shielding film and a light dimming unit of the illuminated vehicular emblem according to the first embodiment of the present disclosure, and FIG. 4 illustrates a schematic top view of the illuminated vehicular emblem while illuminating according to the first embodiment of the present disclosure.

Since the illuminated vehicular emblem 10 adopts the lighting unit 30 which is capable of planar light guiding, the total thickness of the illuminated vehicular emblem 10 can be reduced. Furthermore, under the effect of the light dimming unit 40, the light can horizontally propagate within the lighting unit 30 and then can vertically exit from the lighting unit 30, thereby allowing the light emitting components 32 to be much more compactly distributed. As a result, the required area of the circuit board 35 can be reduced, thereby effectively cutting the cost per illuminated vehicular emblem 10. In addition, the first light shielding film 331 covers the light emitting components 32 from above, and thus the light emitted from the light emitting components 32 does not emit to the outside of the housing unit 20, thereby preventing the illuminated vehicular emblem 10 from generating any dazzling light spot.

Figure 6:
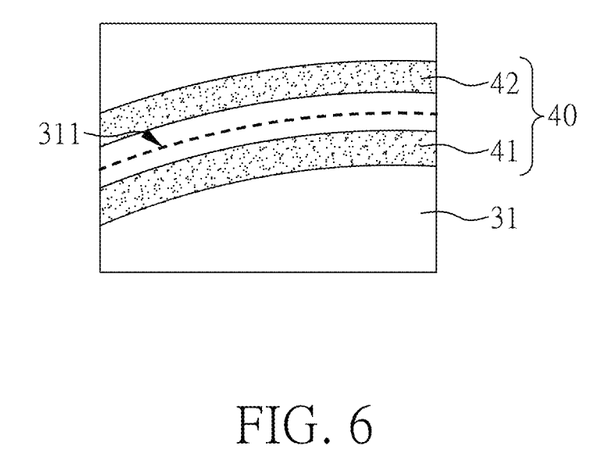
FIG. 6 is a partial enlarged schematic top view of the light dimming unit disposed on the light guide plate according to a second embodiment of the present disclosure.

Please refer to FIG. 6. FIG. 6 illustrates a partial enlarged schematic top view of the light dimming unit disposed on the light guide plate according to a second embodiment of the present disclosure.

In the second embodiment, the light dimming unit 40 further comprises a second dot portion 42. The second dot portion 42 is distributed on the light guide plate 31 and along the first dot portion 41, and disposed outside the first dot portion 41. The preposition "outside" used herein means that the second dot portion 42 is disposed outside a region demarcated by the first dot portion 41; hence, an area of a region demarcated by the second dot portion 42 is greater than an area of the region demarcated by the first dot portion 41. In the second embodiment, the second dot portion 42 and the first dot portion 41 are spaced apart from each other, and the projection position 311 is disposed between the second dot portion 42 and the first dot portion 41. The other components in the second embodiment are identical to their counterparts in the first embodiment, respectively, and thus are, for the sake of brevity, not described further herein. Finally, in the second embodiment, the light emitted from the light emitting components 32 exits from the illuminated vehicular emblem 10 also via the gap 24.

Figure 7:
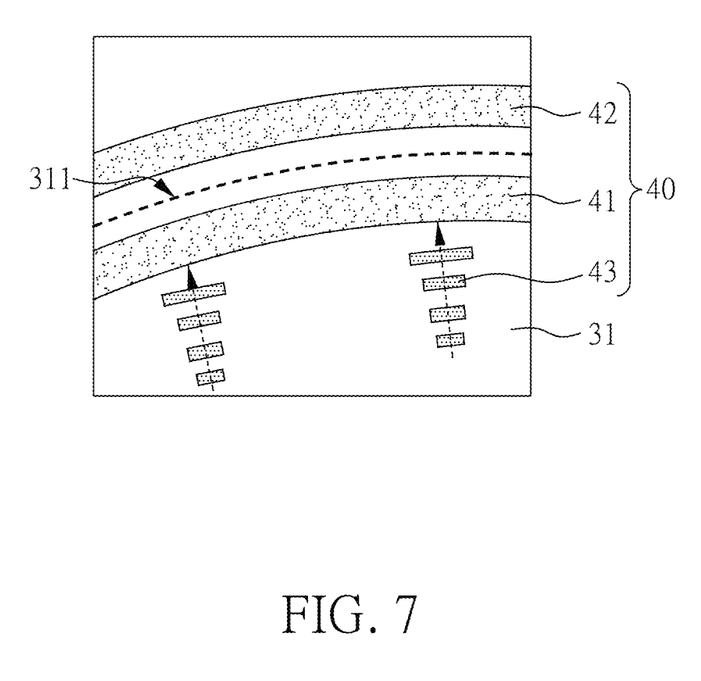
FIG. 7 is a partial enlarged schematic top view of the light dimming unit disposed on the light guide plate according to a third embodiment of the present disclosure.

Now refer to FIG. 7, which illustrates a partial enlarged schematic top view of the light dimming unit disposed on the light guide plate according to a third embodiment of the present disclosure.

In the third embodiment, the light dimming unit 40 further comprises a third dot portion 43. The third dot portion 43 is distributed on the light guide plate 31 and along the direction of propagation of the light (i.e., along the direction from the central area of the light guide plate 31 to the edge of the light guide plate 31), and disposed between the first dot portion 41 and the plurality of light emitting components 32. In the third embodiment, the third dot portion 43 is divided into a plurality of dense dot zones. The dense dot zones are spaced apart. Each dense dot zone is bar-liked, and an extended direction of a maximum length of each dense dot zone is perpendicular to the direction of propagation of the light. In the third embodiment, the maximum length of each dense dot zone gradually increases with the distance between each said dense dot zone and the light emitting components 32. In the third embodiment, each dense dot zone is also constituted by a collection of optical dots. Therefore, when part of the light emitted from the light emitting components 32 reaches the third dot portion 43, such part of the light would be refracted by the dense dot zones and thus be dispersed, so as to mildly reduce the overall intensity of the light which exits from the illuminated vehicular emblem 10 via the gap 24, thereby achieving an adjustment of luminance of the illuminated vehicular emblem 10. The other components in the third embodiment are identical to their counterparts in the second embodiment, respectively, and thus are, for the sake of brevity, not described further herein.

Consequently, the illuminated vehicular emblem 10 of the present disclosure is characterized by that the lighting unit 30 capable of planar light guiding cooperates with the light dimming unit 40 and the first light shielding film 331 to prevent the light emitted from the light emitting components 32 from resulting any dazzling light spot, so as to enable the illuminated vehicular emblem 10 to generate soft illuminant effect and reduce the thickness and the cost of the illuminated vehicular emblem 10.

The above description merely serves to illustrate the preferred embodiments of the present disclosure. For the sake of brevity, the above description does not describe all possible variations and combinations in detail. However, persons skilled in the art will understand that none of the aforesaid modules and components is indispensable. To implement the present disclosure, it is also feasible for the illuminated vehicular emblem of the present disclosure to comprise any other sophisticated conventional modules and components, to dispense with or modify each module and component as needed, or to include any other module and/or component disposed between any two modules; hence, such modifications shall fall within the scope of the appended claims of the present disclosure, provided that they do not depart from the fundamental framework of the present disclosure.

What is claimed is:

1. An illuminated vehicular emblem, suitable for a means of transportation, the illuminated vehicular emblem comprising:
    a housing unit adapted to be disposed on the means of transportation, the housing unit comprising:
        a bottom case;
        a top case disposed on the bottom case; and
            an emblem member disposed above the top case to achieve visual recognition, wherein a receiving space is defined between the top case and the bottom case;
    a lighting unit disposed in the receiving space, the lighting unit comprising:
        a light guide plate;
        a plurality of light emitting components threaded through the light guide plate and disposed at a central area of the light guide plate to allow the light guide plate to receive light emitted from the plurality of light emitting components; and a first light shielding film disposed on the light guide plate; and a light dimming unit disposed on the light guide plate to change a direction of propagation of the light, wherein the light dimming unit comprises a first dot portion and a second dot portion; wherein the first dot portion is distributed on the light guide plate and along a projection of an outline of the emblem member, the second dot portion is distributed on the light guide plate and along the first dot portion, and disposed outside a region demarcated by the first dot portion, to allow part of the light passing through the light dimming unit to be scattered out of a gap between the top case and the emblem member.

2. The illuminated vehicular emblem of claim 1, wherein the second dot portion and the first dot portion are spaced apart.

3. The illuminated vehicular emblem of claim 2, wherein the light dimming unit further comprises a third dot portion which is distributed on the light guide plate and along the direction of propagation of the light, and disposed between the first dot portion and the plurality of light emitting components.

4. The illuminated vehicular emblem of claim 3, wherein the third dot portion is divided into a plurality of dense dot zones that are bar-liked and spaced apart.

5. The illuminated vehicular emblem of claim 4, wherein an extended direction of a maximum length of each said dense dot zone is perpendicular to the direction of propagation of the light.

6. The illuminated vehicular emblem of claim 1, wherein the light dimming unit further comprises a third dot portion which is distributed on the light guide plate along the direction of propagation of the light and disposed between the first dot portion and the plurality of light emitting components.

7. The illuminated vehicular emblem of claim 6, wherein the third dot portion is divided into a plurality of dense dot zones that are bar-liked and spaced apart.

8. The illuminated vehicular emblem of claim 7, wherein an extended direction of a maximum length of each said dense dot zone is perpendicular to the direction of propagation of the light.

9. The illuminated vehicular emblem of claim 1, wherein the light dimming unit further comprises a third dot portion which is distributed on the light guide plate along the direction of propagation of the light and disposed between the first dot portion and the plurality of light emitting components.

10. The illuminated vehicular emblem of claim 9, wherein the third dot portion is divided into a plurality of dense dot zones that are bar-liked and spaced apart.

11. The illuminated vehicular emblem of claim 10, wherein an extended direction of a maximum length of each said dense dot zone is perpendicular to the direction of propagation of the light.

12. The illuminated vehicular emblem of claim 1, wherein the first light shielding film covers the plurality of light emitting components from above.

13. The illuminated vehicular emblem of claim 12, wherein the lighting unit further comprises a second light shielding film which is disposed between the first light shielding film and the light guide plate and has a greater area than the first light shielding film.

14. The illuminated vehicular emblem of claim 1, wherein the lighting unit further comprises a reflection plate disposed between the bottom case and the light guide plate to reflect the light of the plurality of light emitting components.

15. The illuminated vehicular emblem of claim 1, wherein the lighting unit further comprises a diffusion plate disposed between the top case and the first light shielding film to uniform the distribution of the light.

* * * * *